(12) United States Patent
Hofmann et al.

(10) Patent No.: US 12,269,293 B2
(45) Date of Patent: Apr. 8, 2025

(54) WHEEL HOLDER

(71) Applicant: Beissbarth GmbH, Munich (DE)

(72) Inventors: Claudia Hofmann, Munich (DE);
Stefanie Peters, Munich (DE);
Trendafil Ilchev, Munich (DE);
Christian Wagmann, Munich (DE);
Nicolai Ganser, Munich (DE)

(73) Assignee: BEISSBARTH AUTOMOTIVE TESTING SOLUTIONS GMBH, Munich (DE)

( * ) Notice: Subject to any disclaimer, the term of this patent is extended or adjusted under 35 U.S.C. 154(b) by 537 days.

(21) Appl. No.: 17/612,096

(22) PCT Filed: May 14, 2020

(86) PCT No.: PCT/EP2020/063476
§ 371 (c)(1),
(2) Date: Nov. 17, 2021

(87) PCT Pub. No.: WO2020/234113
PCT Pub. Date: Nov. 26, 2020

(65) Prior Publication Data
US 2022/0212497 A1 Jul. 7, 2022

(30) Foreign Application Priority Data
May 17, 2019 (DE) .................... 10 2019 113 128.6

(51) Int. Cl.
*B60B 30/02* (2006.01)
*G01B 5/255* (2006.01)
*G01B 21/26* (2006.01)

(52) U.S. Cl.
CPC .............. *B60B 30/02* (2013.01); *G01B 5/255* (2013.01); *G01B 21/26* (2013.01); *G01B 2210/12* (2013.01)

(58) Field of Classification Search
CPC ......... B60B 30/02; B60B 30/04; B60B 25/02; B60B 25/04; G01B 5/255; G01B 21/26; G01B 2210/12
(Continued)

(56) References Cited

U.S. PATENT DOCUMENTS

| 978,976 | A | * | 12/1910 | Wolff, Jr. ................ B60B 30/06 157/18 |
| 5,446,967 | A | * | 9/1995 | Gender .................. G01B 5/255 33/336 |

(Continued)

FOREIGN PATENT DOCUMENTS

| DE | 102 42 536 B3 | 4/2004 |
| DE | 10 2016 217290 A1 | 3/2018 |

(Continued)

OTHER PUBLICATIONS

International Search Report and Written Opinion nd English Translation, PCT/EP2020/063476, Aug. 18, 2020 (18 pages).
(Continued)

*Primary Examiner* — Hadi Shakeri
(74) *Attorney, Agent, or Firm* — Ware, Fressola, Maguire & Barber LLP (57) ABSTRACT

A wheel holder for fastening to a wheel comprises at least two arms extending outward from a base plate of the wheel holder radially; each of the arms having at least one movable element that is movable radially; a central rotation element that is arranged in the center of the wheel holder such that it can rotate; and at least two coupling elements each extending between one of the movable elements and the central rotation element such that the movable elements are movable radially by rotation of the rotation element. The rotation element is attached to the base plate of the wheel holder via a freewheeling system. The freewheeling system has at least one operating state in which the rotation element (Continued)

is rotatable in a freewheeling direction and rotation of the rotation element in a blocking direction opposite to the freewheeling direction is blocked.

20 Claims, 6 Drawing Sheets

(58) Field of Classification Search
USPC .......................................................... 157/14
See application file for complete search history.

(56) References Cited

U.S. PATENT DOCUMENTS

| | | | |
|---|---|---|---|
| 7,987,889 B1 * | 8/2011 | Story ................. | B60C 25/0521 |
| | | | 157/14 |
| 9,228,819 B2 * | 1/2016 | Pruitt ..................... | G01B 5/255 |
| 10,035,688 B1 * | 7/2018 | Robinson ................. | B66F 5/00 |
| 11,009,335 B2 | 5/2021 | Kambhaluru et al. | |
| 2014/0115906 A1 | 5/2014 | Pruitt et al. | |
| 2018/0347974 A1 | 12/2018 | Ferrari et al. | |

FOREIGN PATENT DOCUMENTS

| | | |
|---|---|---|
| WO | 2017/093922 A1 | 6/2017 |
| WO | 2018/046222 A1 | 3/2018 |
| WO | 2020234116 A1 | 11/2020 |

OTHER PUBLICATIONS

English language Abstract of DE10242536B3.
International Search Report and Written Opinion and English Translation, PCT/EP2020/063493, Aug. 12, 2020 (17 pages).

* cited by examiner

WHEEL HOLDER

The invention relates to a wheel holder or wheel clamp, in particular a wheel holder for vehicle wheel alignment measurement. The invention also relates to a method of mounting and to a method of unmounting such a wheel holder to and from a wheel of a vehicle, in particular a motor vehicle.

For vehicle wheel alignment measurement, there are often mounted wheel holders, which are adapted to support sensors and/or measurement marks ("targets"), on the wheels of the vehicle to be measured for wheel alignment. The handling of such wheel holders, in particular the attaching and detaching thereof to and from the wheels of the vehicle, is as a rule complex and difficult. In particular, there are several working steps required that have to be carried out using two hands. There is a risk that the measurement results of the wheel alignment measurement will be falsified by incorrect and/or inaccurate attachment of the wheel holders.

It is an object of the invention to simplify mounting and unmounting of a wheel holder to and from the wheels of a vehicle and to reduce the risk of incorrect and/or inaccurate mounting.

This object is met by the wheel holder of independent claim 1 and by methods of mounting and removing a wheel holder according to claims 14 and 15. Advantageous developments are indicated in the dependent claims.

The invention relates to a wheel holder that is provided for fastening to a wheel, in particular to a wheel of a motor vehicle, and comprises at least two arms which extend outward from a center of the wheel holder in a radial direction. Each arm comprises a stationary element and at least one movable element, e.g. a carriage, that is movable with respect to the stationary element. The movable element is movable in the radial direction in relation to the stationary element, so that the length of each arm can be varied by moving the movable element in the radial direction.

The wheel holder comprises a synchronization system having a central rotation element which is arranged in the center of the wheel holder such that it can rotate, and at least two coupling elements each extending between one of the movable elements and the central rotation element such that the movable elements are movable in the radial direction by rotation of the rotation element and, vice versa, the rotation element is rotatable by movement of at least one of the movable elements.

The length of the arms of a wheel holder according to the invention can be varied simply by moving the movable elements in the radial direction in order to fix the wheel holder to a wheel and release the same from the wheel, respectively. The synchronization system synchronizes the movements of the movable elements so that all movable elements at all times move synchronously, i.e. all inward or all outward, and across the same movement distance.

The rotation element is mounted on the base plate of the wheel holder with a freewheeling system. The freewheeling system has at least one operating state in which the rotation element can be rotated in a freewheeling direction and rotation of the rotation element is blocked in a blocking direction opposite to the freewheeling direction.

In particular, the freewheeling system has a first and a second operating state, with the freewheeling direction and the blocking direction being mutually reversed in the first and second operating states.

The invention also comprises a method of mounting a wheel holder according to the invention to a wheel, in particular a wheel of a motor vehicle. The method comprises the steps of bringing the freewheeling system into a mounting state in which the movable elements can be moved outward in the radial direction into a mounting position and inward movement of the movable elements is blocked. The method comprises furthermore the step of moving the movable elements outward in the radial direction so as to increase the lengths of the arms; applying the wheel holder with the extended arms to a wheel, in particular a wheel of a motor vehicle; bringing the freewheeling system into a fixing state in which the movable elements can be moved inward in the radial direction and outward movement of the movable elements is blocked; and moving the movable elements inward in the radial direction into a fixing position in which they fix the wheel holder to the wheel. The method may comprise furthermore the step of exerting, by a clamping device, additional forces directed towards the center on the movable elements in order to fix the wheel holder to the wheel in particularly secure manner.

The invention also comprises a method of removing a wheel holder according to the invention from a wheel, in particular from a wheel of a motor vehicle. The method comprises the steps of bringing the freewheeling system into the mounting state in which the movable elements can be moved outward in the radial direction and inward movement of the movable elements is blocked; moving the movable elements outward in the radial direction into a mounting position so as to increase the lengths of the arms; and removing the wheel holder from the wheel. If the wheel holder is provided with a clamping device, the method comprises in addition the step of releasing the damping device so as to be able to move the movable elements outward in the radial direction.

A wheel holder according to the invention can be easily and securely mounted to a wheel and unmounted from the wheel. Due to the blocking effect of the freewheeling mechanism in the mounting state, the movable elements need not be held in the mounting position by muscle power when the wheel holder is applied to the wheel. In particular, there is no risk that the movable elements move inwardly in uncontrolled manner. The risk of injury during mounting of the wheel holder is thus reduced considerably. A wheel holder according to the invention is equally suitable for right and left-handers.

In one embodiment, the freewheeling system is in the form of a ratchet mechanism having a toothed rotor and at least one movable locking member engaging with teeth of the rotor. A ratchet mechanism, as it is used e.g. also in tools, makes available a reliable and proven freewheeling system. Instead of a ratchet mechanism, it is however also possible to make use of other kinds of freewheeling mechanisms. For example, also freewheeling mechanisms as they are used on the rear wheels of bicycles.

In one embodiment, the freewheeling system can be switched between a first operating state, in which the rotation element can be rotated in clockwise direction with respect to the arms and anticlockwise rotation of the rotation element is blocked, and a second operating state, in which the rotation element can be rotated in anticlockwise direction with respect to the arms and clockwise rotation of the rotation element is blocked. In this manner, the freewheeling system can be switched between the mounting state and the fixing state.

In one embodiment, the freewheeling system can be switched into a third operating state in which the rotation element can be rotated freely in both directions. The blocking function of the freewheeling mechanism is deactivated in this operating state, and the movable elements are freely movable in both directions, i.e. inward and outward.

In this third operating state, the wheel holder or adapter behaves like a conventional wheel adapter without a freewheeling system. The third operating state allows a user familiar with the use of a conventional wheel adapter to make use of a wheel adapter according to the invention without having to adapt. The range of the application of the wheel adapter is thus increased.

In one embodiment, the wheel holder comprises a clamping device which is designed to apply a force to the freewheeling system in a tensioned state in order to apply additional forces ("tensioning forces") which are directed towards the center of the wheel holder, to the movable elements by rotation of the freewheeling system. By applying additional forces to the movable elements, which are directed towards the center of the wheel holder, the wheel holder can be fixed to the wheel in particularly secure manner.

In one embodiment, the clamping device comprises a clamping handle and a clamping force transmitting element. The clamping force transmitting element is adapted to transfer a clamping force exerted on the clamping handle to the ratchet system or the rotation element. The clamping force transmitting element may comprise a rod, a chain, a wire or cable pull, a belt and/or a hydraulic system.

In one embodiment, the clamping device comprises a locking mechanism permitting locking of the clamping device in a tensioned state, so that the clamping force generated by the clamping device is applied to the movable elements without further action of a user, in particular without manual holding of the clamping handle. The locking mechanism may comprise in particular a releasable ratchet mechanism, e.g. with a serrated tooth geometry which automatically locks the clamping device in a tensioned state and which can be released so as to permit removal of the wheel holder from the wheel.

In one embodiment, the freewheeling system has a main body which is rotatably mounted on the base plate, and a rotation body connected to the rotation element. The force transmitting element is connected to the main body of the freewheeling system in order to permit, by applying a tensioning force to the main body of the freewheeling system, tensioning of the rotation element in such a manner that it exerts an additional force on the movable elements.

In one embodiment, the wheel holder comprises at least one drive device which is connected to one of the movable elements via a force transmitting element and is designed to apply to said one movable element a force directed towards the center of the wheel holder via the force transmitting element.

In one embodiment, the at least one force transmitting element extends substantially parallel to one of the arms, in particular along one of the arms of the wheel holder. In this manner, the force may be transferred from the drive device to the movable elements of the wheel holder in particularly efficient manner.

In one embodiment, the at least one force transmitting element comprises a rod, a chain, a wire, a cable pull, in particular a steel cable pull as it is used in a Bowden cable, or a belt. Such a force transmitting element is flexible so that it can be routed easily between the drive device and the respective movable element. A flexible force transmitting element, for example, can be passed around rollers. A flexible force transmitting element can also be wound onto a rotary element, for example a wheel, a roller or a drum, of the drive device so as to apply a tensile force or traction to the movable element.

In one embodiment, the at least one drive device comprises a wheel, a roller or a drum, and the at least one force transmitting element can be wound onto the wheel, the roller or the drum in order to apply a tensile force to the movable element. In one embodiment, the wheel, roller or drum is rotatable about an axle that is aligned orthogonal to a common plane of the arms. In this manner, the tensile force can be transferred efficiently from the drive device to one of the movable elements.

In one embodiment, the at least one drive device comprises an elastic element that is designed to drive the force transmitting element. The elastic element may be a spiral spring, for example. A spiral spring allows the provision of an inexpensive and reliable drive device.

In one embodiment, the at least one drive device is arranged outside of the center of the wheel holder, in particular spaced apart from a central axis about which the rotation element rotates ("rotation element axis"). In one embodiment, the at least one drive device is arranged in particular in a region/angle between two adjacent arms of the wheel holder. In particular, the at least one drive device may be arranged near the base plate and/or adjacent the base plate between two adjacent arms of the wheel holder.

Such a configuration permits a particularly space-saving and compact construction of the wheel holder. In particular, the dimension (thickness) of the wheel holder in a direction orthogonal to the plane spanned by the arms of the wheel holder can be kept small. Furthermore, such a configuration permits an efficient transfer of the force generated by the at least one drive device to one of the movable elements.

In another embodiment, the at least one drive device is arranged in the center of the wheel holder, in particular on the rotation element axis.

In one embodiment, the wheel holder comprises at least two drive devices and at least two force transmitting elements. By making use of two or more drive devices, the elastic force acting in total on the movable elements ("overall force") can be increased. By applying a high overall force, the wheel holder can be fixed to the wheel in particularly secure and tight manner.

In one embodiment, the drive devices are arranged between different arms of the wheel holder and act on different movable elements of the wheel holder. By distributing the forces exerted by the drive devices to several movable elements, it is possible to reduce the forces acting on the coupling elements and the rotation element. The coupling elements and the rotation elements can then be formed less massive, i.e. lighter and of less material, and thus can be formed at lower costs.

In one embodiment, the rotation element is rotatable about a rotation element axis that is aligned orthogonal to a common plane of the arms, and/or the coupling elements extend substantially parallel to a virtual plane spanned by the arms. In this manner, the movements of the movable elements can be synchronized with each other in particularly efficient manner.

In one embodiment, the rotation element is designed as a star-shaped rotation element comprising a central portion and at least two rotation element arms, and each of the coupling elements is connected to one of the rotation element arms. By way of a star-shaped rotation element formed with the rotation element arms, it is possible to realize, with little material usage, a mechanical transmission in order to increase the movement distances over which the coupling elements move when the rotation element is rotated by a predetermined angle.

In one embodiment, the coupling elements are each pivotably connected to the rotation element and the movable elements in order to enable an efficient transmission of force from the rotation element to the movable elements.

In one embodiment, the wheel holder has three arms that allow the wheel holder to be securely attached to a wheel. In particular, the three arms can be aligned in a symmetric configuration with equal angular distances of 120°, with other angular distances, however, being possible as well.

In other possible embodiments the wheel holder has more than three arms.

An exemplary embodiment of a wheel holder according to the invention will be described in more detail in the following with reference to the accompanying drawings.

DESCRIPTION OF THE FIGURES

Figure 1:
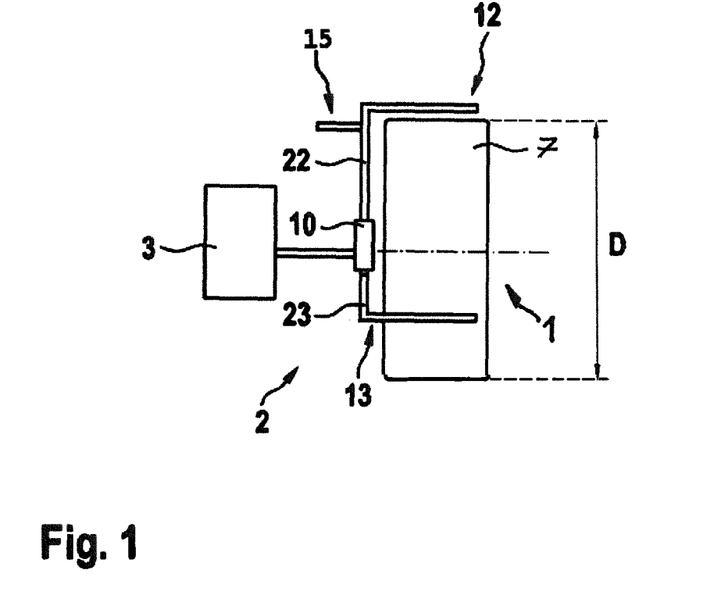
FIG. 1 shows a schematic representation of a wheel with a wheel holder attached to the wheel.

FIG. 1 shows a simplified schematic representation of a wheel 1 together with a wheel holder or wheel clamp 2 which is mounted on the wheel 1 and has a target 3 attached thereto.

Figure 2:
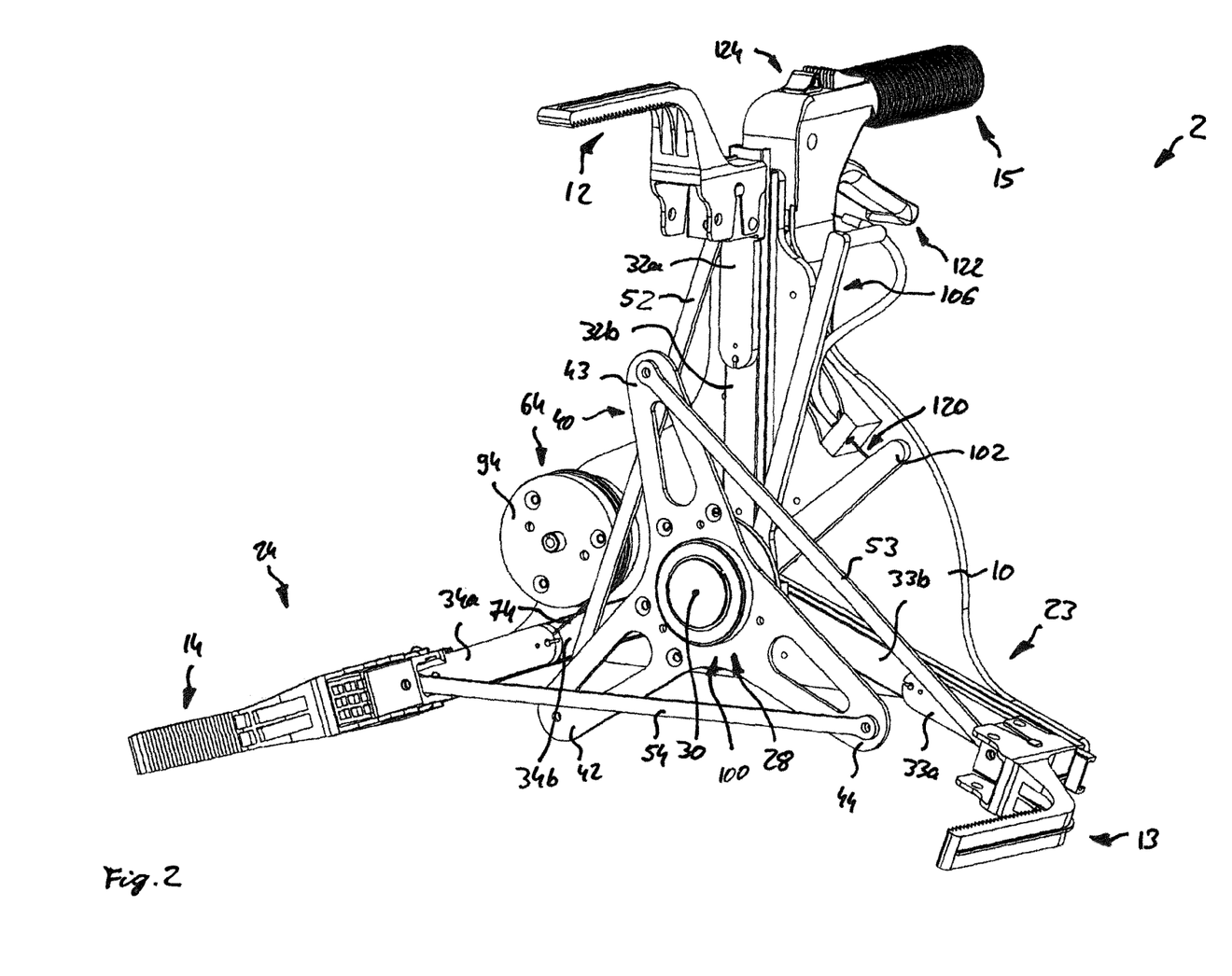
FIG. 2 shows a perspective view of a wheel holder according to an embodiment the invention.
Figure 3:
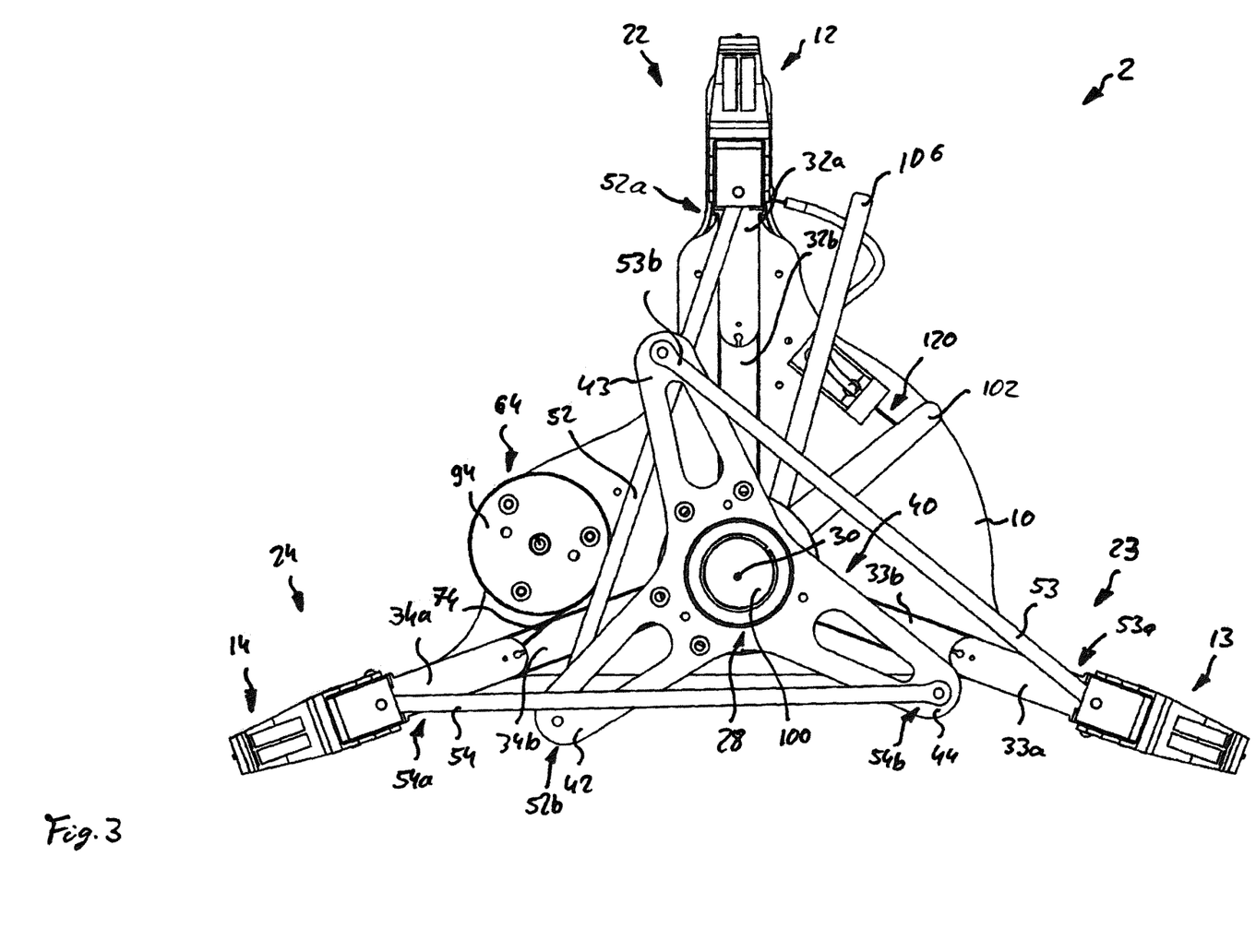
FIG. 3 shows a plan view of the wheel holder shown in FIG. 2.
Figure 4:
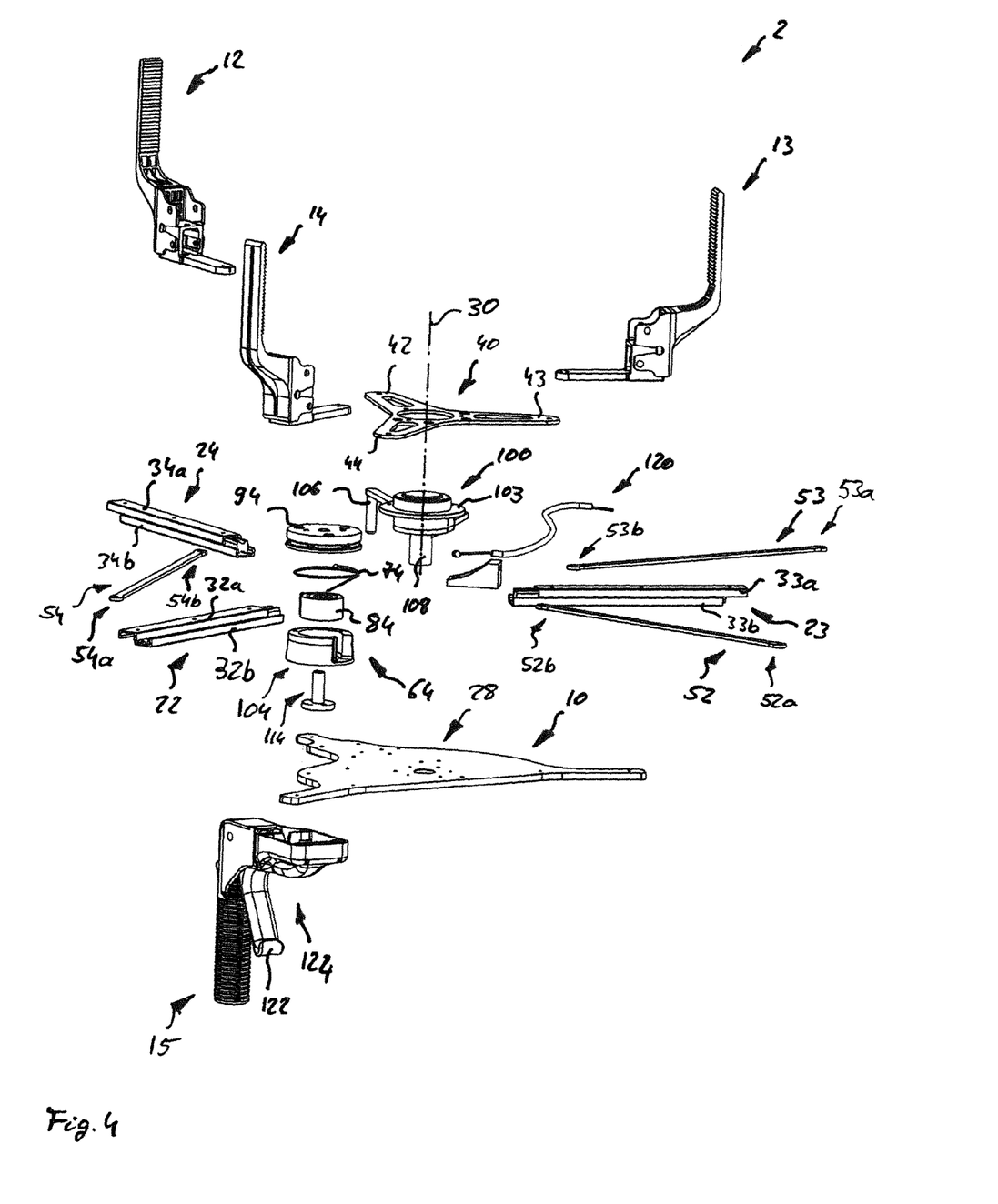
FIG. 4 shows an exploded view of the wheel holder shown in FIGS. 2 and 3.

FIG. 2 shows a perspective view of a wheel holder 2 according to an exemplary embodiment of the invention. FIG. 3 shows a plan view of the wheel holder shown in FIG. 2, and FIG. 4 shows an exploded view of the wheel holder 2 shown in FIG. 2.

The wheel holder 2 comprises a base plate 10 and three arms 22, 23, 24 extending radially outward from a central portion ("center") 28 of the wheel holder 2. The arms 22, 23, 24 extend substantially parallel to the plane of the base plate 10. The arms 22, 23, 24 may be, but do not have to be, aligned at equal angular distances of 120° relative to one another.

One of the arms 22, 23, 24 has a handle 15 formed thereon for facilitating transport and handling of the wheel holder 2.

A central axis ("rotation element axis") 30 extends orthogonal to the base plate 10 through the center 28 of the wheel holder 2.

The arms 22, 23, 24 each comprise a stationary inner element 32b, 33b, 34b and a movable outer element 32a, 33a, 34a which is movable with respect to the stationary elements 32b, 33b, 34b and is movable, in particular slidable, along the respective inner element 32b, 33b, 34b in the radial direction. The length of the arms 22, 23, 24 in the radial direction can thus be varied by moving, in particular sliding, the outer elements 32a, 33a, 34a along the inner elements 32b, 33b, 34b.

At outer ends of the outer elements 32a, 33a, 34a facing away from the center 28, claws 12, 13, 14 are mounted which extend substantially at right angles to the arms 22, 23, 24. The claws 12, 13, 14 are designed to rest on the tread surface 7 of a wheel 1 (not shown in FIGS. 2 to 4) when the wheel holder 2 is attached to the wheel 1, as shown in FIG. 1, in order to fix the wheel holder 2 to the wheel 1.

By moving/sliding the outer elements 32a, 33a, 34a outward in the radial direction, the length of the arms 22, 23, 24 is extended so that the wheel holder 2 can be easily attached to the wheel 1 in the axial direction of the wheel 1. By moving the outer elements 32a, 33a, 34a inward, i.e. in the direction towards the center 28, the length of the arms 22, 23, 24 is decreased, so that the claws 12, 13, 14 rest on the tread surface 7 of the wheel 1 and fix the wheel holder 2 to the wheel 1, as shown in FIG. 1.

A wheel holder 2 according to an exemplary embodiment of the invention comprises furthermore a central rotation element 40, for example a rotation plate 40. The rotation element 40 is mounted on the central axis 30 in the center 28 of the base plate 10 such that it can be rotated about the central axis 30. The rotation element 40 extends substantially parallel to the virtual plane spanned by the base plate 10 and the arms 22, 23, 24.

Each of the movable elements 32a, 33a, 34a is connected to the rotation element 40 by a respective coupling element 52, 53, 54.

An inner end 52b, 53b, 54b of each coupling element 52, 53, 54, which is directed towards the center 28, is movably, in particular pivotably, connected to the rotation element 40. An outer end 52a, 53a, 54a of each coupling element 52, 53, 54, which is directed away from the center 28, is movably, in particular pivotably, connected to one of the movable elements 32a, 33a, 34a. The coupling elements 52, 53, 54 are thus pivotable with respect to the rotation element 40 and the movable elements 32a, 33a, 34a in a plane extending substantially parallel to the plane of the base plate 10.

The coupling elements 52, 53, 54 transform any rotational movement of the rotation element 40 about the central axis 30 into translational movements of the movable elements 32a, 33a, 34a in the radial direction along the stationary inner elements 32b, 33b, 34b, and vice versa. Thus, by rotating the rotation element 40 about the central axis 30, the movable elements 32a, 33a, 34a can be moved synchronously in the radial direction along the inner elements 32b, 33b, 34b in order to thus vary the length of the arms 22, 23, 24. Likewise, the rotation element 40 rotates about the central axis 30 when the movable elements 32a, 33a, 34a are moved in the radial direction along the inner elements 32b, 33b, 34b.

By way of the rotation element 40 and the coupling elements 52, 53, 54, the movable elements 32a, 33a, 34a of the arms 22, 23, 24 are coupled to one another such that all movable elements 32a, 33a, 34a, and thus also the claws 12, 13, 14, move synchronously, i.e. in the same direction ("inward" or "outward") and at the same speed, when one of the movable elements 32a, 33a, 34a is moved. The rotation element 40 and the coupling elements 52, 53, 54 thus constitute a synchronization system.

The distance between the claws 11, 12, 13 of a wheel adapter 2 according to the invention can thus be easily adjusted by moving one of the movable elements 32a, 33a, 34a, such that the wheel holder 2 can be easily, in particular with just one hand, applied to the wheel 1.

In the exemplary embodiment shown in FIGS. 2 to 4, the coupling elements 52, 53, 54 are designed as coupling rods 52, 53, 54, The coupling rods 52, 53, 54 may be formed of e.g. stamped sheet metal parts.

The coupling elements 52, 53, 54 may also have a different shape, as long as they fulfill the previously described function of coupling the rotation element 40 with the movable elements 32a, 33a, 34a such that rotational movement of the rotation element 40 causes translational movements of the movable elements 32a, 33a, 34a, and vice versa.

In the exemplary embodiment shown in FIGS. 2 to 4, the rotation element 40 is in the form of a star-shaped rotation element 40 with three rotation element arms ("rotation element projections") which extend radially outward from a central portion of the rotation element 40. The inner ends 52b, 53b, 54b of the coupling elements 52, 53, 54 are each pivotably connected to an outer portion of one of the rotation element arms 42, 43, 44.

By way of a star-shaped design of the rotation element 40, it is possible with little expenditure and little material usage to implement a mechanical transmission which increases the distance over which the movable elements 32a, 33a, 34a move in the radial direction when the rotation element 40 is rotated about the central axis 30 by a predetermined angle.

However, the rotation element arms 42, 43, 44 of the rotation element 40 shown in the figures are not a necessary feature of the invention. The rotation element 40 may also be in the form of e.g. a round, in particular a circular or elliptical, disk or an angular, e.g. triangular, square or polygonal, disk.

A wheel holder 2 formed in accordance with an exemplary embodiment of the invention comprises, furthermore, at least one drive device 64 designed for driving or drivingly moving at least one of the movable elements 32, 33, 34.

The wheel holder 2 shown in FIGS. 2 to 4 comprises one single drive devices 64 which is designed to drive the movable element 34a of an arm 24. However, a wheel holder 2 according to an exemplary embodiment of the invention may also comprise a plurality of drive devices 64, in particular a separate drive device 64 for each one of the arms 22, 23, 24.

The drive device 64 is arranged between two adjacent arms 23, 24 of the wheel holder 2. In particular, the drive device 64 is arranged in the angle that is formed by two adjacent arms 23, 24 at the base plate 10.

In an alternative embodiment, not shown in the figures, the drive device 64 is arranged in the center 28 of the wheel holder 2, in particular on the central axis ("rotation element axis") 30.

The drive device 64 is connected to an inner end of an associated force transmitting element 74. An outer end of the force transmitting element 74 is connected to the movable element 34a.

Together with the force transmitting element 74, the drive device 64 forms a drive system 64, 74 which drives or drivingly moves the movable element 34a connected to the force transmitting element 74. In particular, the drive device 64 is designed to apply an elastic force to the force transmitting element 74 which elastically pulls the force transmitting element 74, and thus also the movable element 34a connected to the force transmitting element 74, in the direction towards the center 28 of the wheel holder 2.

Although the wheel holder 2 shown in FIGS. 2 to 4 has only one drive device 64 which drives only one of the movable elements 32a, 33a, 34a, the coupling/synchronization of the movable elements 32a, 33a, 34a by way of the synchronization system 40, 52, 53, 53 has the effect that the movable elements 32a, 33a, 34a and the claws 12, 13, 14 of the wheel holder 2 move synchronously in the radial direction along the stationary elements 32b, 33b, 34b of the arms 22, 23, 24, when at least one of the movable elements 32a, 33a, 34a and/or one of the claws 12, 13, 14 is moved.

In particular, the movable elements 32a, 33a, 34a and/or claws 12, 13, 14 can be moved outward against the elastic force generated by the drive device 64, which acts in the direction towards the center 28 of the wheel holder 2, e.g. by muscle power in order to extend the arms 22, 23, 24 such that the wheel holder 2 can be conveniently attached to a wheel 1 or removed from the same.

Due to the elastic force generated by the drive device 64, which is directed towards the center 28 of the wheel holder 2, the wheel holder 2 automatically adapts to different sizes (diameters D) of the wheel 1 in the radial direction within the scope of movement, i.e. the maximum path length, of the outer elements 32a, 33a, 34a. A wheel holder 2 according to the invention thus can be very easily attached to wheels 1 of different sizes and removed from such wheels 1.

Figure 5:
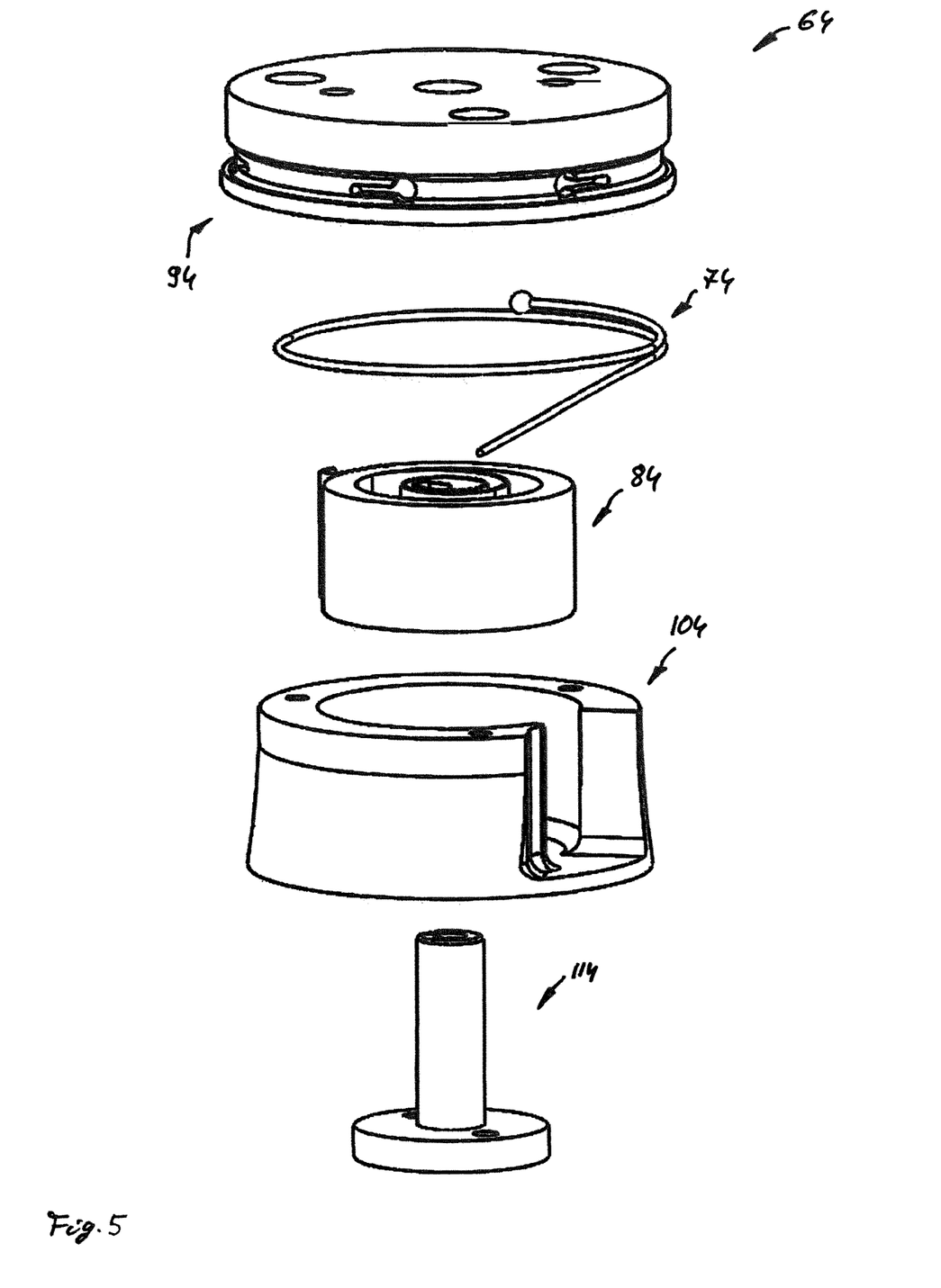
FIG. 5 shows an exploded view of a drive device as it is used with the wheel holder shown in FIGS. 2 to 4.

FIG. 5 shows an enlarged exploded view of a drive device 64 as it may be used in a wheel holder 2 formed in accordance with an exemplary embodiment of the invention.

The drive device 64 shown in FIG. 5 has a substantially rotationally symmetrical housing 104 extending about a central axle 114. Mounted on the axle 114 is a drum 94. The drum 94 is rotatable about the axle 114 and designed to wind up a flexible force transmitting element 74, e.g. a flexible steel rope, on the drum 94.

The axle 114 is aligned substantially orthogonal to the plane spanned by the arms 22, 23, 24 of the wheel holder 2.

The flexible force transmitting element 74 may also be in the form of a chain, belt, wire or the like, as long as it can be wound onto a drum 94 or a wheel or similar rotating element not shown in the figures, and is capable of transferring a sufficiently large force from the drive device 64 to the movable element 34a.

Between the drum 94 and the axle 114, there is disposed an elastic element 84, for example a spiral spring. The elastic element 84 is connected to the drum 94 and the axle 114 such that it drivingly moves the drum 94 so that the drum 94 endeavors to rotate about the axle 114 and, in doing so, to wind up and thus shorten the flexible force transmitting element 74.

By winding-up the flexible force transmitting element 74 on the drum 94, the force transmitting element 74 exerts an elastic (tensile) force on the movable element 34a connected to the second end of the force transmitting element 74 (not shown in FIG. 5), with the elastic force trying to pull the movable element 34a in the direction towards the center 28 of the wheel holder 2.

When the claws 12, 13, 14 of the wheel holder 2 are pulled apart, the force transmitting element 74 is unwound from the drum 94.

The rotation of the drum 94 about the axle 114 which is caused by unwinding the force transmitting element 74 from the drum 94, effects additional tension in the elastic element 84 connected to the drum 94. The movable element 34a of the wheel holder 2 is thus pulled again in the direction towards the center 28 of the wheel holder 2 by the force transmitting element 74, as soon as the force applied by a user for pulling apart the movable elements 32a, 33a, 34a or claws 12, 13, 14 is removed, e.g. because the claws 12, 13, 14 are released.

Figure 6:
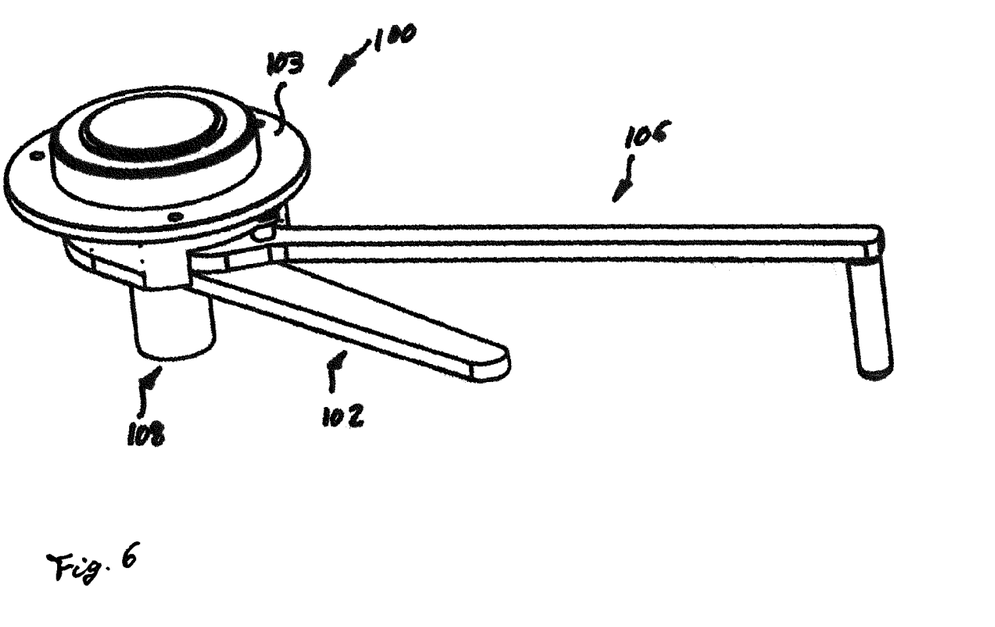
FIG. 6 shows a perspective view of a freewheeling system as it is used with the wheel holder shown in FIGS. 2 to 4.

The rotation element 40 is attached to the base plate 10 of the wheel holder via a freewheeling system 100. A perspective external view of the freewheeling system 100 is shown in FIG. 6.

The freewheeling system 100 comprises a main body 108 attached to the base plate 10, and a rotation body 103 which is rotatable with respect to the main body 108. The rotation element 40, which is not shown in FIG. 6, is mounted on the rotation body 103.

The freewheeling system 100 comprises furthermore a switching lever 106 which permits switching of the freewheeling system 100 between at least two different operating states.

In a first operating state, the rotation body 103 together with the rotation element 40 is rotatable with respect to the main body 108 in clockwise direction ("freewheeling direction"), as shown in the illustration in FIGS. 2 and 3, whereas rotation of the rotation body 103 in the opposite direction ("blocking direction"), i.e. anti-clockwise, is blocked.

In the first operating state, the movable elements 32a, 33a, 34a along with the claws 12, 13, 14 can be moved, by muscle power and/or by the force generated by the drive device 64, in the direction towards the center 28 of the wheel holder 2 in order to press the claws 12, 13, 14 against the tread surface 7 of a wheel 1 and to thus securely fix the wheel holder 2 to the wheel 1, The first operating state thus is a fixing state.

Due to the fact that the rotation element 40 and the rotation body 103, in the first operating state/fixing state cannot be rotated in anticlockwise direction with respect to the main body 108, the respective movable elements 32a, 33a, 34a and the claws 12, 13, 14 cannot be moved outwardly in the first operating state/fixing state for extending the arms 22, 23, 24 to permit removal of the wheel holder 2 from the wheel.

For being able to remove the wheel holder 2 from the wheel 1, the freewheeling system 100 is brought into a second operating state by shifting the switching lever 106. In the second operating state, the rotation body 103 together with the rotation element 40, in the illustration shown in FIGS. 2 and 3, is rotatable in anticlockwise direction with respect to the main body 108, whereas rotation of the rotation body 103 in the opposite direction, i.e. in clockwise direction, is blocked.

Thus, in the second operating state, the freewheeling direction and the blocking direction are mutually reversed with respect to the first operating state.

In the second operating state, the movable elements 32a, 33a, 34a together with the claws 12, 13, 14 can be moved outwardly from the center 28 of the wheel holder 2y, e.g. by muscle power, in order to be thus able to remove the claws 12, 13, 14 and the wheel holder 2 from the wheel 1. Also, the movable elements 32a, 33a, 34a together with the claws 12, 13, 14 can be moved outwardly in the second operating state, before the wheel holder 2 is applied to the wheel 1, in order to thus match the distance between the claws 12, 13, 14 to the size of the wheel 1, so that the wheel holder 2 can be applied conveniently to the wheel. The second operating state thus is a mounting state.

In the second operating state/mounting state, the blocking effect of the freewheeling system 100 prevents the movable elements 32a, 33a, 34a along with the claws 12, 13, 14 to be pulled by the drive device 64 in the direction towards the center 28. Thus, in the second operating state/mounting state, the movable elements 32a, 33a, 34a and the claws 12, 13, 14 remain in their outwardly pulled positions until the freewheeling system 100 is brought into the first operating state/fixing state.

Due to the fact that the movable elements 32a, 33a, 34a and the claws 12, 13, 14 in the second operating state/mounting state do not have to be retained in their outer positions by muscle power, handling of the wheel holder 2 is simplified. Moreover, operational safety is enhanced, since uncontrolled "snapping back" of the movable elements 32a, 33a, 34a and the claws 12, 13, 14 in the direction towards the center 28 of the wheel holder 2 is prevented by the blocking effect of the freewheeling system 100.

Optionally, the freewheeling system 100 may have a third operating state in which the blocking function is deactivated in both directions, so that the rotation body 103 is rotatable with respect to the main body 108 in both directions.

Switchable freewheeling systems 100 that are suitable for use in a wheel holder 2 according to the invention are known to the skilled person.

A freewheeling system 100, for example, may be formed with an externally toothed rotor which is connected to the rotation body 103, and with a locking member which is connected to the main body 108 and engages with the external teeth of the rotor such that the rotor can be rotated in one direction only ("freewheeling direction"), while the locking member blocks rotation of the rotor in the opposite direction ("blocking direction").

In a wheel holder 2 according to the invention, there may also be used other known, in particular switchable, freewheeling mechanisms, in particular freewheeling mechanisms with low friction in the freewheeling direction and/or with a sufficiently high holding force in the blocking direction.

In a wheel holder 2 according to the invention, the main body 108 of the freewheeling system 100 is rotatably attached to the base plate 10. The main body 108 is provided with a clamping lever 102 extending from a central portion of the main body 108 outward in the radial direction.

A clamping force transmitting element 120 (see FIGS. 2 to 4) connects the clamping lever 102 to clamping handle 122 provided at the handle 15 of the wheel holder 2. The clamping handle 122 and the clamping force transmitting element are constituent parts of a clamping device 120, 122. By operating the clamping handle 122, the clamping device 120, 122 allows an additional force to be applied to the freewheeling system 100, which pushes the claws 12, 13, 14 still tighter against the tread surface 7 of the wheel 1 in order to fix the wheel holder 2 still more securely to the wheel 1.

In/at the handle 15 of the wheel holder 2, there is formed a locking mechanism 124. The locking mechanism 124 permits fixing of the clamping handle 122 and/or the clamping force transmitting element 120 in a tensioned position, in which the additional force is applied to the claws 12, 13, 14, without requiring a user of the wheel holder 2 to constantly exert muscle power for retaining the clamping handle 122 in a tensioned position.

The locking mechanism 124 is releasable to permit release of the clamping device 120, 122, so that the wheel holder 2 can easily be unmounted from the wheel 1.

The clamping force transmitting element 120 may be provided in the form of a cable wire (e.g. a "Bowden cable"), in particular with a steel rope as shown in FIGS. 2 to 4. As an alternative, the clamping force transmitting element 120 may comprise a rod, a chain, a belt and/or a hydraulic system for transferring the force exerted on the clamping handle 122 to the clamping lever 102 of the freewheeling system 100.

For mounting a wheel holder 2 formed according to an exemplary embodiment of the invention to a wheel 1, the freewheeling system 100 is brought first into the mounting state, in which it is possible to pull the movable elements 32a, 33a, 34a with the claws 12, 13, 14 outwardly against the force of the drive device 64, and to increase the distance between the claws 12, 13, 14 (i.e. the "diameter" of the wheel holder 2) such that the wheel holder 2 can easily be applied to the wheel 1. The blocking effect of the freewheeling system 100 in the mounting state prevents undesired "snapping back" of the claws 12, 13, 14 in this state. Thus, the claws 12, 13, 14 need not be held in a pulled apart state by muscle power when the wheel adapter 2 is applied to the wheel 1.

The wheel holder 2 is applied to the wheel in the expanded state such that the claws 12, 13, 14 extend across the tread surface 7 of the wheel 1.

By shifting the switching lever 106, the freewheeling system 100 is then switched from the mounting state to the fixing state. In the fixing state, the freewheeling system 100 sets free rotation of the rotation element 40 such that the movable elements 32*a*, 33*a*, 34*a* with the claws 12, 13, 14 are pulled "inward" by the force of the drive device 64 in the direction towards the center 28 of the wheel holder 2. The claws 12, 13, 14 are thereby pressed against the tread surface 7 of the wheel 1 and thereby fix the wheel holder 2 to the wheel 1.

The blocking effect of the freewheeling system 100 in the fixing state prevents the movable elements 32*a*, 33*a*, 34*a* from moving outward again so as to release the claws 12, 13, 14 from the tread surface 7 of the wheel 1.

When the claws 12, 13, 14 rest on the tread surface 7 of the wheel 1, it is possible by actuation of the clamping handle 122 to exert an additional force, via the clamping force transmitting element 120, the freewheeling system 100 and the synchronization system 40, 52, 53, 54, to the movable elements 32*a*, 33*a*, 34*a* and the claws 12, 13, 14 in order to fix the wheel holder 2 still more tightly to the wheel 1.

The clamping handle 122 can be fixed in the tensioned position by the locking mechanism 124 so that it is not necessary to permanently grip or hold the clamping handle 122.

For unmounting the wheel holder 2, the locking mechanism 124 is released first. In addition, the freewheeling system 100 is returned to the mounting state by shifting the switching lever 106, in which it is possible to move the movable elements 32*a*, 33*a*, 34*a* with the claws 12, 13, 14 outwardly so as to permit simple removal of the wheel holder 2 from the wheel 1. In doing so, the blocking effect of the freewheeling system 100 in the mounting state prevents the movable elements 32*a*, 33*a*, 34*a* with the claws 12, 13, 14 from moving inward due to the force exerted by the drive device 64. The wheel holder 2 can thus be removed easily from the wheel 1 without the claws 12, 13, 14 having to be retained against the force of the drive device 64. In particular, there is no risk of injury by claws 12, 13, 14 snapping back in uncontrolled manner.

A wheel holder 2 formed in accordance with an exemplary embodiment of the invention can thus be easily and securely mounted on a wheel 1 and unmounted from the wheel 1.

The invention claimed is:

1. A wheel holder for fastening to a wheel, the wheel holder comprising:
    at least two arms extending from a base plate of the wheel holder in a radial direction outward; each of the arms having at least one stationary element and at least one movable element that is movable with respect to the at least one stationary element in the radial direction;
    a central rotation element that is disposed in a center of the wheel holder such that it can rotate;
    at least two coupling elements each extending between one of the movable elements and the central rotation element such that the movable elements are movable in the radial direction by rotation of the central rotation element;
    wherein the central rotation element is attached to the base plate of the wheel holder via a freewheeling system, and wherein the freewheeling system has at least one operating state in which the central rotation element is rotatable in a freewheeling direction and rotation of the central rotation element in a blocking direction opposite to the freewheeling direction is blocked;
    wherein the wheel holder further comprises a clamping device which is adapted to apply a force to the freewheeling system in a tensioned state in order to apply additional forces which are directed towards the center of the wheel holder, to the movable elements by rotation of the freewheeling system;
    wherein the clamping device comprises a clamping handle and a clamping force transmitting element which is designed to transfer a force exerted on the clamping handle to the freewheeling system;
    wherein the clamping device comprises a locking mechanism which is designed to lock the clamping device in the tensioned state; and
    wherein the clamping force transmitting element comprises a rod, a chain, a wire or cable pull, a belt and/or a hydraulic system.

2. The wheel holder according to claim 1, wherein the freewheeling system is switchable between a first operating state in which the central rotation element is rotatable in clockwise direction and rotation of the central rotation element in anticlockwise direction is blocked, and a second operating state in which the central rotation element is rotatable in anticlockwise direction and rotation of the central rotation element in clockwise direction is blocked.

3. The wheel holder according to claim 2, wherein the freewheeling system can be switched into a third operating state in which the central rotation element is rotatable in both directions.

4. The wheel holder according to claim 1, wherein the clamping device comprises a locking mechanism which is designed to lock the clamping device in the tensioned state.

5. The wheel holder according to claim 4, wherein the locking mechanism comprises a releasable ratchet mechanism.

6. The wheel holder according to claim 1, wherein the freewheeling system comprises a main body rotatably attached to the base plate, as well as a rotation body connected to the central rotation element, and wherein the clamping force transmitting element is connected to the main body of the freewheeling system.

7. The wheel holder according to claim 1, wherein the wheel holder comprises three arms.

8. The wheel holder according to claim 7, wherein the three arms are arranged at angular distances of 120° about the center of the wheel holder.

9. A method of mounting the wheel holder according to claim 1 to a wheel, said method comprising the steps of:
    bringing the freewheeling system into a mounting state in which the movable elements are movable outward in a radial direction and inward movement of the movable elements is blocked;

moving the movable elements outward in radial direction so as to increase the lengths of the arms;

applying the wheel holder to the wheel; and bringing the freewheeling system into a fixing state in which the movable elements are movable inward in radial direction and outward movement of the movable elements is blocked; and moving the movable elements in a direction towards the center so as to fix the wheel holder to the wheel.

10. A method of releasing the wheel holder according to claim 1 from a wheel, said method comprising:

releasing a clamping device and/or bringing the freewheeling system into a mounting state in which the movable elements can be moved outward in radial direction and inward movement of the movable elements is blocked;

moving the movable elements outward in radial direction so as to increase the lengths of the arms; and removing the wheel holder from the wheel.

11. A wheel holder for fastening to a wheel, the wheel holder comprising:

at least two arms extending from a base plate of the wheel holder in a radial direction outward; each of the arms having at least one stationary element and at least one movable element that is movable with respect to the at least one stationary element in the radial direction;

a central rotation element that is disposed in a center of the wheel holder such that it can rotate;

at least two coupling elements each extending between one of the movable elements and the central rotation element such that the movable elements are movable in the radial direction by rotation of the central rotation element;

wherein the central rotation element is attached to the base plate of the wheel holder via a a freewheeling system, and wherein the freewheeling system has at least one operating state in which the central rotation element is rotatable in a freewheeling direction and rotation of the central rotation element in a blocking direction opposite to the freewheeling direction is blocked;

further comprising at least one drive device which is connected to one of the movable elements via a force transmitting element and is designed to apply to said one movable element a force directed towards the center of the wheel holder via the force transmitting element;

wherein the force transmitting element extends substantially parallel to one of the arms or along one of the arms, or wherein the force transmitting element comprises a chain, a wire, a cable pull, or a belt or a rod;

wherein the at least one drive device comprises a wheel, a roller or a drum; and wherein the force transmitting element is adapted to be wound onto the wheel, the roller or the drum.

12. The wheel holder according to claim 11, wherein the at least one drive device is arranged outside of the center of the wheel holder.

13. The wheel holder according to claim 12, wherein the at least one drive device is arranged in a region between two arms of the wheel holder.

14. The wheel holder according to claim 11, wherein the wheel, the roller or the drum can be rotated about an axle that is aligned orthogonal to a common plane of the arms.

15. The wheel holder according to claim 11, wherein the freewheeling system is switchable between a first operating state in which the central rotation element is rotatable in clockwise direction and rotation of the central rotation element in anticlockwise direction is blocked, and a second operating state in which the central rotation element is rotatable in anticlockwise direction and rotation of the central rotation element in clockwise direction is blocked.

16. The wheel holder according to claim 15, wherein the freewheeling system can be switched into a third operating state in which the central rotation element is rotatable in both directions.

17. The wheel holder according to claim 11, wherein the wheel holder comprises three arms.

18. A wheel holder for fastening to a wheel, the wheel holder comprising:

at least two arms extending from a base plate of the wheel holder in a radial direction outward; each of the arms having at least one stationary element and at least one movable element that is movable with respect to the at least one stationary element in the radial direction;

a central rotation element that is disposed in a center of the wheel holder such that it can rotate;

at least two coupling elements each extending between one of the movable elements and the central rotation element such that the movable elements are movable in the radial direction by rotation of the central rotation element;

wherein the central rotation element is attached to the base plate of the wheel holder via a freewheeling system, and wherein the freewheeling system has at least one operating state in which the central rotation element is rotatable in a freewheeling direction and rotation of the central rotation element in a blocking direction opposite to the freewheeling direction is blocked;

further comprising at least one drive device which is connected to one of the movable elements via a force transmitting element and is designed to apply to said one movable element a force directed towards the center of the wheel holder via the force transmitting element;

wherein the at least one drive device comprises an elastic element, which is adapted to drive the force transmitting element.

19. The wheel holder according to claim 18, wherein the freewheeling system is switchable between a first operating state in which the central rotation element is rotatable in clockwise direction and rotation of the central rotation element in anticlockwise direction is blocked, and a second operating state in which the central rotation element is rotatable in anticlockwise direction and rotation of the central rotation element in clockwise direction is blocked.

20. The wheel holder according to claim 19, wherein the freewheeling system can be switched into a third operating state in which the central rotation element is rotatable in both directions.

* * * * *